United States Patent [19]

Coblentz

[11] 4,237,696
[45] Dec. 9, 1980

[54] COMPRESSED AIR SYSTEM

[76] Inventor: Robert C. Coblentz, 761 Avenue D, SW., Winter Haven, Fla. 33880

[21] Appl. No.: 954,318

[22] Filed: Oct. 24, 1978

[51] Int. Cl.³ .................... F25D 17/06; B01D 51/00
[52] U.S. Cl. .............................. 62/93; 62/179; 55/269; 55/DIG. 17
[58] Field of Search .............. 62/93, 179; 60/39.67; 415/179; 417/243; 55/269, DIG. 17

[56] References Cited

U.S. PATENT DOCUMENTS

| | | | |
|---|---|---|---|
| 2,126,266 | 8/1938 | Laird | 62/93 X |
| 2,301,938 | 11/1942 | Fator | 62/185 X |
| 2,632,315 | 3/1953 | Coblentz | 62/271 |
| 3,034,315 | 5/1962 | Coblentz | 62/272 |

OTHER PUBLICATIONS

*Thermal Mass Air Dryers*, Ingersoll-Rand, 11 Broadway, New York, 10004, received in Group 170, May 19, 1972.

*Triple Duty Valves*, Bulletin A-516, Bell and Gossett ITT, Fluid Handling Division, 8200 N. Austin Ave., Morton Grove, Ill., published 1974.

*Primary Examiner*—William E. Wayner
*Assistant Examiner*—Harry B. Tanner
*Attorney, Agent, or Firm*—Duckworth, Hobby & Allen

[57] ABSTRACT

An air conditioning system for taking atmospheric air under any seasonal condition and delivering refrigerated, dry, high density air to a compressor which can then operate at full capacity delivering dry, full volume air to a reheater and air dryer which delivers dry plant air in a plant air system. The compressed air system has a water chiller for chilling water passing therethrough in a water line when the water is above a predetermined temperature and a pump for pumping the water from the chiller water line into an inlet air cooler and dryer which is coupled to the atmosphere to receive atmospheric air and remove moisture. The compressor receives the air from the inlet cooler and dryer, compresses the air, and delivers it to a reheat air dryer where additional moisture is removed and the air is reheated. The chiller water line from the inlet cooler dryer passes through the reheat air dryer to remove additional moisture and back into the water chiller to form a closed cycle recycling water system. The inlet cooler dryer has a bypass system to bypass or repass the cooling coils in the inlet cooler dryer when the temperature drops below a predetermined level.

16 Claims, 6 Drawing Figures

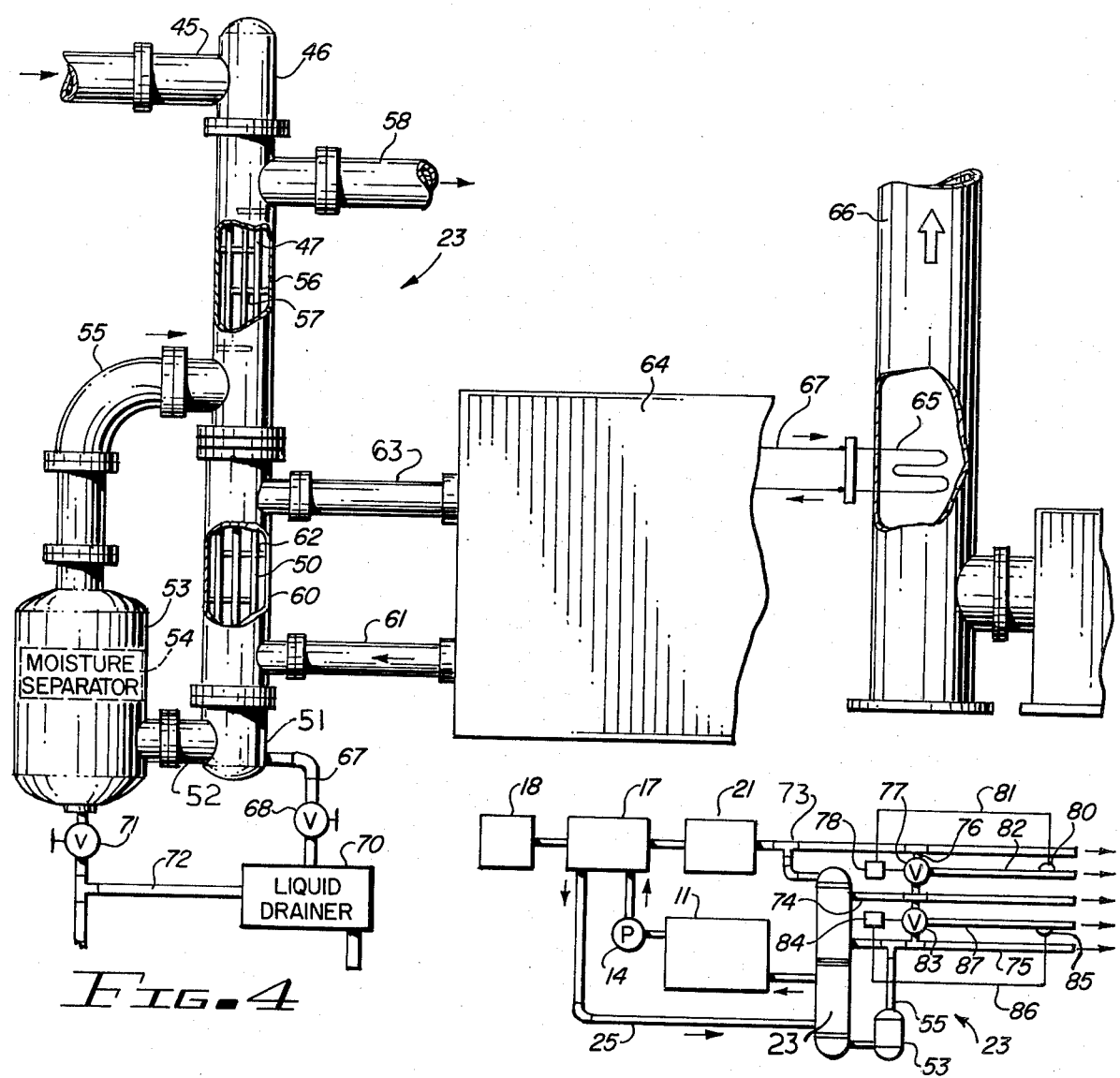
Fig. 4
Fig. 5
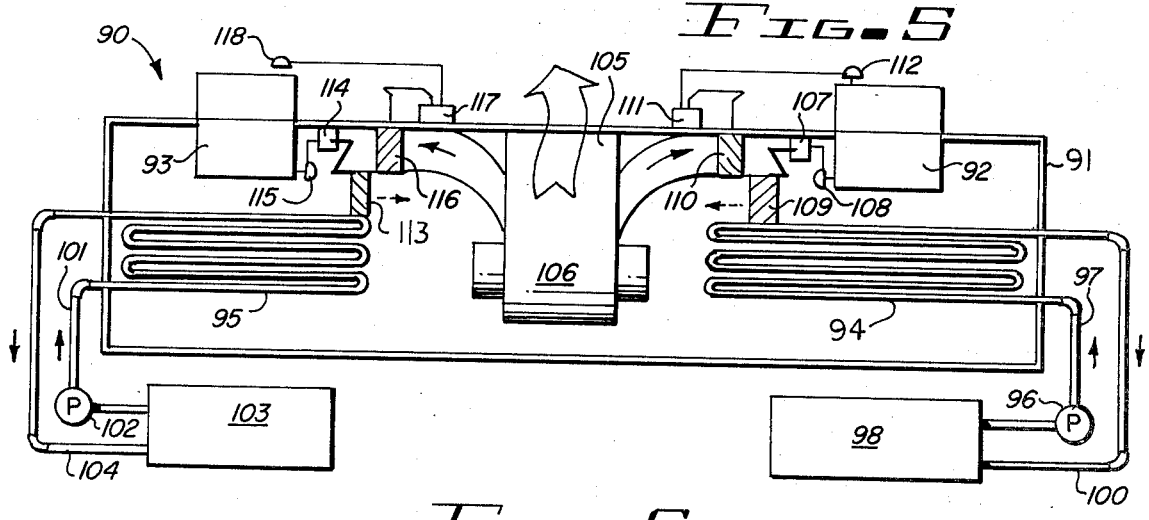
Fig. 6

COMPRESSED AIR SYSTEM

BACKGROUND OF THE INVENTION

The present invention is a system for delivering dry, compressed air to a plant air system with increased efficiency.

In the past, it has been common to provide compressed air for plant air systems by compressing atmospheric air, directing the compressed air through an after-cooler which removes large amounts of moisture. The moisture is removed by a heat exchange system having cooling water from a cooling tower, used in connection with the after-cooling equipment, to cool the heated compressed air and condense moisture into a separator and drain. However, it is desirable to remove moisture prior to compression to save air compressor power by the reduction in volume of air at compressor inlet caused by cooling and removal of moisture. There is also a reduction in the discharge temperature on single stage compressors. In addition, the use of dry plant air in a plant air system reduces maintenance costs and wet air problems, such as caused by the condensation in the air operated equipment.

In my prior U.S. Pat. No. 3,034,315, I removed the moisture primarily by pre-cooling and pre-drying so that the hot compressed air entering the air lines results in an increase in air volume and a substantial savings in power and water. Pre-cooling requires low temperatures for adequate moisture removal, introducing the problem of freezing in cold weather, and can cause pulsation of the compressor intake to cause unwanted vibrations and noise. These problems were dealt with in the above patent. In my prior U.S. Pat. No. 2,632,315, a system for delivering dry, compressed air at higher efficiencies also cooled the intake air prior to delivery to the compressor and in part, from the delivery of the compressed air to the compressed air lines in a heated condition. Other air conditioning systems can be seen in my prior U.S. Pat. No. 3,015,216 for an air conditioning system, and U.S. Pat. No. 2,984,082 for an air conditioning system, and U.S. Pat. No. 2,939,296 for an air cooling system, and U.S. Pat. No. 2,773,356 for an air cooling system with recirculating passageway.

Aside from my prior patents, the prior art typically uses intake filters for preventing dust and dirt being drawn into the compressors, and to eliminate wear in the cylinders and pistons and to prevent carbonization of the compressor valves. The prior art further uses after-coolers to remove the moisture and oil condensed from the air to prevent troublesome condensation in the pipe lines. Cooling water pumps are used in prior art systems for circulating the cooling water for the after-coolers, along with cooling refrigeration systems, and finally, moisture separators have been commonly used for the separation of mist and entrained liquids from the air system.

In contrast to the prior art, the present invention deals with improvements to my prior patents, and especially to improving the efficiency of the operation of an air conditioning system for delivering dry heated air to a plant air system.

SUMMARY OF THE INVENTION

The present invention deals with a compressed air system for providing dry plant air to a plant air system, and includes a water chiller for chilling water and water chilling lines, which water chillers are actuated only when the water passing therethrough is above a predetermined temperature. A pump is connected to the water chiller lines for pumping water passing through the water chiller lines. The water chiller line is connected to an inlet air cooler and dryer which is coupled to the atmospheric air to receive air through a pair of filters and to cool and predry the inlet air. The air is fed to a centrifugal air compressor, where it is compressed and discharged to a reheat air dryer, which also is connected to the chilled water line from the inlet air cooler for removing additional moisture from the compressed air. The compressed air is reheated and discharged to the plant air system, while the chilled water line is connected back to the water chillers. Thus, the chilled water line forms a recirculating closed circuit which can cool and dry the inlet air to the air compressor and can further dry the compressed air. The water chillers are designed to be actuated only as the water in the chilled water line exceeds predetermined levels so that they do not operate when the ambient air temperature drops. The water which is heated from the heated compressed air in the recirculating system is fed back to the inlet air cooler and is used to raise the temperature of the inlet air for more efficient operation of the air compressor in cold weather. A bypass valve is provided on the inlet air cooler to bypass or repass the chilled water heat exchanger under predetermined conditions.

BRIEF DESCRIPTION OF THE DRAWING

Other objects, features and advantages of the present invention will be apparent from the written description and the drawings, in which:

FIG. 4 is a fragmentary elevation of a modified reheat air dryer;

FIG. 5 is a diagrammatic view of an alternate embodiment for providing discharge air of different temperatures; and FIG. 6 is a sectional view of an alternate embodiment of an inlet cooler dryer.

DESCRIPTION OF THE PREFERRED EMBODIMENTS

Figure 1:
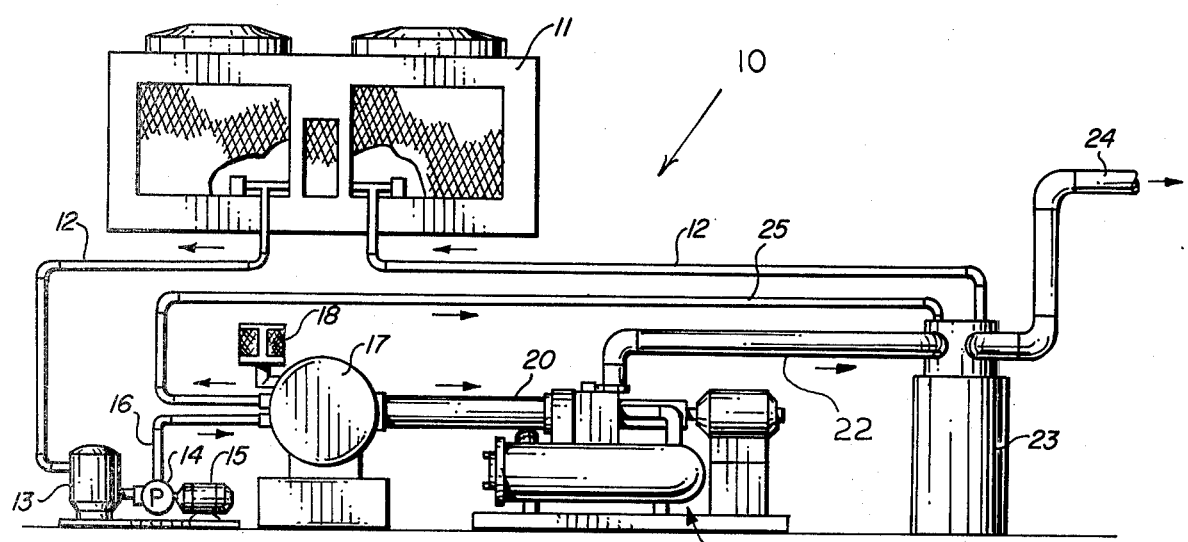
FIG. 1 is a side elevation of a compressed air system in accordance with the present invention.

Referring to the drawings, and especially to FIG. 1, a compressed air system 10 has a packaged outdoor air cooled liquid chiller 11 having a water line 12 entering one portion thereof and exiting at another point. The chilled water line 12 leaves the liquid chiller 11 and enters an air separator 13 connected to a water pump 14 driven by an electric motor 15, as illustrated more clearly in connection with FIG. 2. The water leaves the pump 14 through the water line 16 and enters the inlet cooler/dryer 17, more clearly illustrated in connection with FIG. 3, and in an alternate embodiment in FIG. 6. Atmospheric air enters the compressed air system 10 through dual inlet air filters 18 where the air is directed into the inlet cooler/dryer 17 where it is cooled and dried and passes through an air line 20 into a centrifugal air compressor 21. The air is compressed and is directed from the compressor 21 through a compressed air line 22 into a reheat air dryer 23, more clearly illustrated in a modified form in FIG. 4. The compressed air passes from the reheat air dryer into a plant air line 24, which air line may be connected as shown in FIG. 5 to give a series of air lines having different temperatures of plant air. The chilled water from the inlet cooler/dryer 17 passes through chilled water line 25 into the reheat dryer 23, where it is used to dry the compressed heated air from the compressor 21. The chilled water then passes through line 12 into the liquid chiller 11. The chilled water through lines 12, 16 and 25 form a closed circuit chilled water line as shown in FIG. 1, in which the water temperature is controlled by the packaged outdoor air cooled liquid chiller 11, which is actuated thermostatically if the water in the chilled water line rises above a set point.

In operation, the inlet air passes through the two stage inlet filters 18 where air pollutants are removed from the atmospheric air, which then passes directly into the inlet cooler/dryer 17. The inlet air at this point may be typically cooled to 37° F. Dry Bulb, or less, regardless of the ambient air conditions. Moisture is removed, so that the dew point of the compressor 21 inlet air is approximately 35° F. when it enters the compressor. After the air is compressed in the compressor 21, it passes directly through one or more reheat air dryers 23 so that the conventional after-cooling equipment, normally used at this point, as well as the refrigerated air dryers are eliminated. The reheat air dryer 23 is made up of an air-to-air heat exchanger where the compressed air from the air compressor 21 passes through tubes of the heat exchanger and then moves through tubes of a water-to-air heat exchanger, where additional moisture is removed from the compressed air. At this point, the air is slowed down to a lower velocity and passed through a moisture separator eliminator, where additional moisture is coalesced and removed from the compressed air. The cold air then passes through the outside of the tube of the air-to-air heat exchanger where it not only cools the air from the air compressor, but is also reheated so that no further condensation is in the plant air system. The temperature of the plant air system might typically be above 50° F. The inlet air cooler/dryer 17 is equipped with an air bypass valve so that air can be allowed to pass the heat exchanger when the temperature of the atmospheric air drops below a point where any further cooling and drying is necessary, thus reducing the energy requirements in colder climates to pre-cool and pre-dry the air for the compressor 21. In addition, in very cold weather, the water in the water chiller line 25 is heated by the compressed air from the compressor 21 output line 22, which passes through the line 12 and through the heat exchanger of the inlet cooler/dryer 17 in a heated condition relative to the outside temperature. This allows the inlet air to be preheated so that the compressor is required to operate on air within a much more limited temperature range than ambient air.

Figure 2:
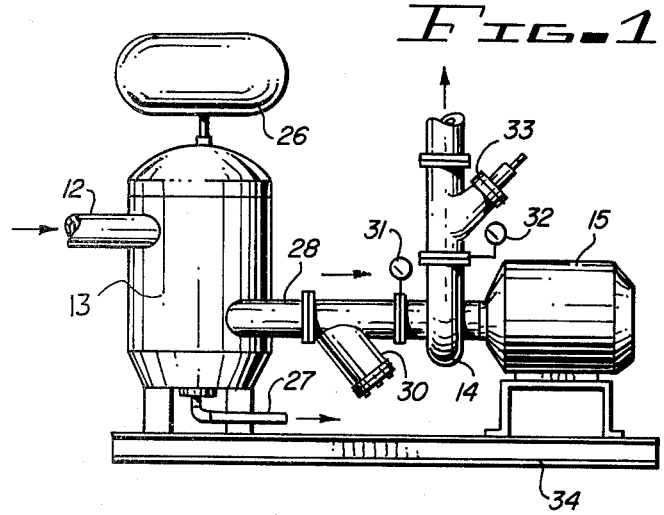
FIG. 2 is a side elevational view of the cold water pump used in FIG. 1.

Turning now to FIG. 2, the chilled water line 12 enters the air separation tank 13 where air is separated from the chilled water and collected in an air container 26. The air separator 13 has a drain 27 and directs chilled water through a pipeline 28 which has a strainer and drain 30 and a water pressure gauge 31 for measuring the pressure entering the pump 14, which is driven by the electric motor 15. A pressure gauge 32 is located on the water outlet of the pump 14, as is a three-way valve 33. The three-way valve 33 has a check valve spring loaded with a vertical lift check and a balance valve with a calibrated adjustment feature to adjust the flow of the chilled water system to obtain the necessary temperature rise through the intake cooler/dryer. This valve also has a shutoff with a grooved stem for a balance point memory. The entire pump system is mounted as a packaged unit on a rigid steel base 34.

Figure 3:
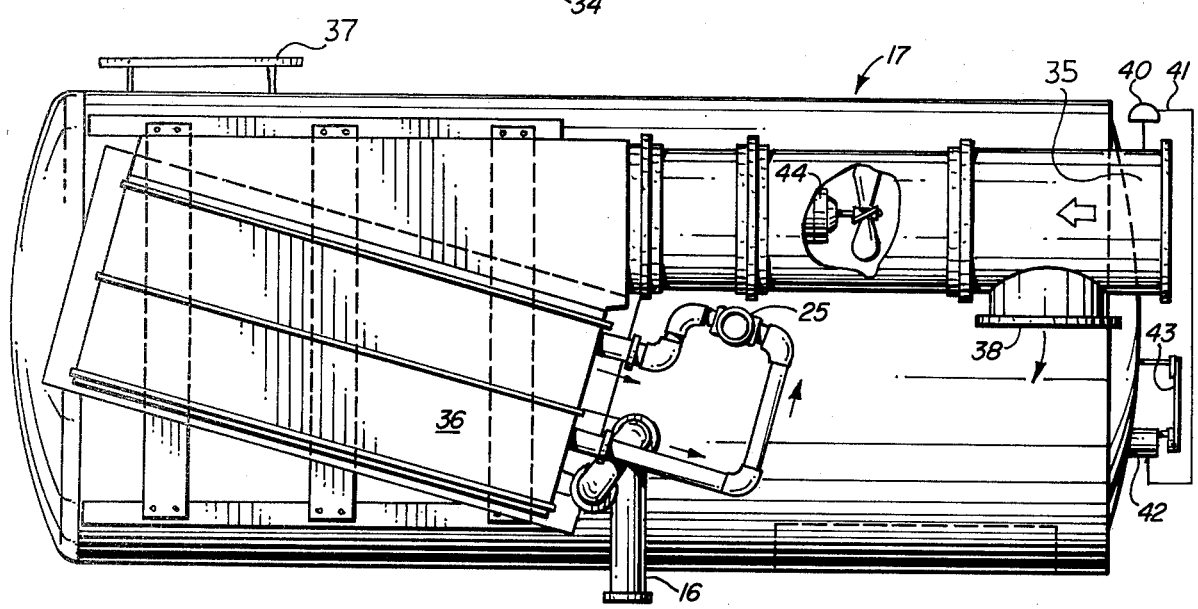
FIG. 3 is a sectional view of an inlet cooler and dryer used in the embodiment of FIG. 1.

FIG. 3 illustrates a single stage inlet cooler/dryer 17 with an air input line 35 for receiving air from the intake filters 18 directing the air through a water-to-air heat exchanger 36 having the water line 16 bringing water thereinto and exiting through water line 25. The air passes through the heat exchanger 36 around its sides and out the outlet air opening 37 which passes through line 20 to the compressor 21 (of FIG. 1). The heat exchanger 36 cools and drys the air and may be a dual heat exchanger with increased drying capacity as seen in FIG. 6. The cooler/dryer unit 17 has a bypass/repass valve 38 which when opened allows the air to pass from the inlet 35 through the valve 38 and bypass the heat exchanger 36. This valve can be automatically operated through a thermostat 40 connected by wiring 41 to a damper motor 42 connected by standard damper linkage 43 to the valve, so that when the temperature of the air drops below a certain point, the valve 38 can be opened to bypass the heat exchanger as desired, since air below a certain point will already be sufficiently cool and dry and considerable energy can be saved since the water chillers 11 are only actuated when the water in the chilled water lines exceeds a predetermined temperature. The bypass valve can also be used as a repass control, which is controlled either manually or automatically for operating the internal axial blower 44 to provide for repassing portions of the air through the heat exchanger 36 more than one time. Repassing the inlet air provides the maximum amount of dehumidification of the inlet air stream. When the bypass and repass valve is closed, the internal axial blower installed inside the housing compensates for the pressure drop as the inlet air is dehumidified and refrigerated by the extended surface cooling coils of the heat exchanger 36.

FIG. 4 shows the reheat air dryer 23 which has a wet plant air inlet 45 from the compressor 21 through the air line 22 entering a manifold portion 46 of the reheat air dryer, where it is fed through a tube sheet through a plurality of air heat exchanger tubes 47, which passes through a second tube sheet and continues with matching heat exchanger air tubes 50 through a water-to-air heat exchanger, and into a collection manifold 51, and out an outlet pipe 52 into a moisture separator tank 53 having a moisture eliminator separator element 54 for the entrainment of liquid from the vapor stream. The enlarged tank 53 lowers the velocity of the air passing from the pipes 52 so that a lower velocity air passes through the moisture separator element 54. The moisture separator element is fabricated of knitted wire plastic mesh for collecting moisture in the air passing therethrough, and is a well-known, commercially available item. The air passing from the tank 53 passes through air pipe 55 into the heat exchanger 56 having the air tubes 47 passing therethrough. Heat exchanger 56 has a plurality of baffles 57 forcing the air to snake its way in a serpentine fashion through the heat exchanger 56 and out the outlet pipe 58. Since the air passing through the pipes 47 has been substantially heated through the compressor, it reheats the air passing from the pipe 55 through the heat exchanger 56 so that the air leaving the output pipe 58 has been reheated. Initial compressed air is cooled in the water-to-air heat exchanger 60 having the pipes 50 passing therethrough with the air, while chilled water enters an inlet pipe 61, follows a serpentine path around the baffles 62 to an outlet path 63. The chilled water entering the pipe 61 comes from a water chiller 64 which can be connected to the chilled water pipes 25 and 12 or to the present plant chilled water system, or it can be a separate packaged liquid chiller with a water cooled condensor, which for instance, could also be a chiller operating from the heat of an economizer 65 located in a plant stack 66 and connected to the chiller 64 through water lines 67. This chills the air passing through the pipes 50 so that additional moisture is removed and collected in the collection manifold 51 where it may be drained through a pipe 67 having a valve 68 for controlling the drainage into a liquid drain collector 70. Similarly, water collecting in the moisture separator tank 53 can pass through a valve 71, through a water line 72, and into the liquid drainer line 70. It should be realized at this point that FIG. 4 shows an alternate embodiment, and the inlet chilled water line 61 and outlet 63 would normally receive the chilled water from the recirculating chilled water line 25 in a closed circulating system, as illustrated in FIG. 1, which may be boosted in accordance with the chiller 64, if desired, or which may be operated entirely by the chiller 64.

FIG. 5 shows another alternate embodiment having the compressor 21 connected to the inlet cooler/dryer 17 which is connected to the inlet air filter 18 and in which the chilled water line is connected through the pump 14 to the chillers 11. Chiller water line 25 connects the inlet cooler/dryer 17 to the reheat air dryer 23 which operates the same as FIGS. 1 and 4, except that a direct air line 73 from the compressor 21 might typically have a line air temperature of 270° F., while the normal outlet 74 from the reheat air dryer 23 might have a temperature of 230° F. exiting the reheat air dryer 23. An additional output line 75 may be connected to the reheat air dryer heat exchanger to remove air passing through the pipes 55 which has been cooled, but not reheated, and therefore, might typically be 50° F. Lines 73 and 74 can further be connected by a line 76 having a mixing control valve 77 therein. A thermostat actuated control 78 for the valve 77 is operated by a thermostat 80 connected by a line 81 to the valve control 78 to mix the air from lines 73 and 74 into an output line 82, which might typically have an output air of 200° F. Similarly, a mixing valve 83 can mix air from the lines 74 and 75 with a thermostatic control 84 operated by a thermostat 85 through a thermostat line 86 to provide air through an output line 87, which might be an intermediate temperature, such as 90° F. Thus, through the system in FIG. 5, air at a plurality of different temperatures in dry air lines can be provided for a manufacturing plant having such a requirement.

FIG. 6 shows an alternate embodiment of an inlet cooler/dryer as shown in FIG. 3, but having a dual system for large centrifugal air compressor installations. The two stage inlet air cooler/dryer 90 of FIG. 6 has a casing 91 having dual inlets 92 and 93 located on each side thereof, as well as dual heat exchangers 94 and 95. Heat exchanger 94 receives its chilled water through a pump 96 and water line 97 from a chiller 98 with the water being returned through a line 100. Heat exchanger 95 receives its chilled water through a line 101 from a pump 102 and a water chiller 103. The water is returned through a line 104 to the water chiller 103. Air entering either inlet 92 or 93 is directed to their respective heat exchangers 94 and 95 and out an outlet air opening 105, which might have an air blower 106 mounted therein. Similar to the prior units, a bypass valve 109 mounted adjacent the opening 92 can be operated by damper motor 107 from a thermostat 108, while a repass valve 110 can be actuated by the damper motor 111 and operated by a thermostat 112. A similar bypass valve 113 may be operated by a damper 114 and a thermostat 115, while a repass valve 116 may be operated by a damper motor 117, actuated by a thermostat 118. Thus, the air can be circulated once through the heat exchangers 94 and 95, or they can be partially or fully bypassed and alternatively can be repassed around the heat exchangers to more completely dry the air passing therethrough. In this cooler/dryer, the piping can also be arranged so that during parts of the year when only a small amount of cooling is required, one refrigeration and one pump unit can supply both sets of cooling coils, thereby reducing the power required for the operation of the cooling and drying. Similarly, one pump unit and one chiller can take care of either cooling requirement, should it become necessary because of servicing of one of the liquid chiller systems.

It should be clear at this point that a compressed air system for providing compressed air in an efficient manner has been provided. It should also be clear that other embodiments are contemplated as being within the spirit and scope of the invention, which is not be construed as limited to the forms shown, which are to be considered illustrative rather than restrictive.

I claim:

1. A compressed air system comprising in combination:

water chiller means for chilling water passing therethrough and a water chiller line when water passing therethrough is above a predetermined temperature;

pump means connected to said water chiller line for pumping water passing through said water chiller line;

inlet air conditioning means coupled to the atmosphere to receive air and to said water chiller line for receiving water passing therethrough, said inlet air conditioning means having at least two heat exchangers mounted therein and connected to said water chiller line for removing moisture from inlet air passing therethrough, and each heat exchanger being coupled to a separate opening and having an individually actuated bypass valve for bypassing air around each heat exchanger;

compressor means operatively coupled to said inlet air conditioning means for receiving air from said inlet air conditioning means and compressing said air; and reheat air dryer means connected to said compressor means for receiving compressed air therefrom, and said reheat air dryer being coupled to said inlet air conditioning means water chiller line for receiving water therefrom, said water chiller line also being connected between said reheat air dryer means and said water chiller means, whereby said water chiller line forms a recirculating line for drying air before and after compression.

2. A compressed air system in accordance with claim 1, in which said pump means includes an air separator connected to a base and coupled to said water chiller line and an electric motor driven pump attached to said base and coupled to said air separator for pumping said water passing through said water chiller line and a three-way valve attached to said pump, said three-way valve including a check valve spring loaded with a vertical lift check and a balance valve with a calibrated adjustment.

3. A compressed air system in accordance with claim 2, in which each said inlet air conditioning means bypass valve is connected to a thermostatically actuated damper motor for actuating said bypass valve upon a predetermined temperature being reached at the inlet to said inlet air conditioning means.

4. A compressed air system in accordance with claim 1, in which said reheat air dryer means includes an air-to-air heat exchanger connected to a water-to-air heat exchanger which is connected to a moisture separator which in turn is connected back to said air-to-air heat exchanger, and said water chiller lines from said inlet air conditioning means is connected to said water-to-air heat exchanger portion of said reheat air dryer means.

5. A compressed air system comprising in combination:
   water chiller means for chilling water passing therethrough and a water chiller line when water passing therethrough is above a predetermined temperature;
   pump means connected to said water chiller line for pumping water passing through said water chiller line;
   inlet air conditioning means coupled to the atmosphere to receive air and to said water chiller line for receiving water passing therethrough, said inlet air conditioning means having at least two heat exchangers mounted therein and connected to said water chiller line for removing moisture from inlet air passing therethrough, and each heat exchanger being coupled to a separate opening and having an individually actuated bypass valve for bypassing air around each heat exchanger;
   compressor means operatively coupled to said inlet air conditioning means for receiving air from said inlet air conditioning means and compressing said air;
   reheat air dryer means connected to said compressor means for receiving compressed air therefrom, and said reheat air dryer being coupled to said inlet air conditioning means water chiller line for receiving water therefrom, said water chiller line also being connected between said reheat air dryer means and said water chiller means, whereby said water chiller line forms a recirculating line for drying air before and after compression; and
   said reheat air dryer means outlet having one outlet directly from said compressor means outlet and a second outlet from said reheat air dryer means air-to-air heat exchanger and a third outlet from one end of said water-to-air heat exchanger, whereby a plant can be supplied with compressed air at three different temperatures.

6. A compressed air system in accordance with claim 5, in which at least two of said outlets from said reheat air dryer means are connected to giving an intermediate temperature air through a fourth output air line.

7. A compressed air system in accordance with claim 6, in which at least two outlets from said reheat dryer means have a connection to a thermostaticaly actuated mixing valve to produce a predetermined intermediate compressed air temperature in said fourth output air line.

8. In a compressed air system having an inlet air cooler and dryer for cooling and drying air connected to a compressor for compressing the air, a reheat air dryer connected to the output of the compressor comprising in combination:
   an air-to-air heat exchanger for passing said compressed air through for cooling and drying said compressed air;
   a water-to-air heat exchanger connected to said air-to-air heat exchanger for further cooling and drying said compressed air, said water-to-air heat exchanger being connected to water chilling means for chilling the water passing therethrough;
   a moisture separator connected to said water-to-air heat exchanger for the removal of moisture from said compressed air passing therethrough, an outlet for said moisture separator being connected to said air-to-air heat exchanger for cooling the compressed air being fed therethrough;
   at least two outlets from predetermined points from said reheat air dryer each producing outlet air at a different temperature; and
   connecting means connecting at least said two outlets with a third outlet through a mixing valve whereby at least a third temperature outlet is provided.

9. A compressed air system in accordance with claim 8, in which said connecting means connecting at least said two outlets with a third outlet through a mixing valve includes a thermostatically controlled mixing valve for adjusting the mixing from each of the outlets to produce compressed air at a predetermined third temperature level.

10. The compressed air system in accordance with claim 8, in which said reheat air dryer has three outlets therefrom, the center outlet being connected to each of the other outlets through thermostatically controlled mixing valves to produce two additional compressed air output lines having intermediate temperature between two of the outlet lines from said reheat air dryer.

11. A compressed air system comprising in combination:
   water chiller means for chilling water passing therethrough in a water chiller line when water passing therethrough is above a predetermied temperature;
   pump means connected to said water chiller line for pumping water passing through said water chiller line;
   inlet air conditioning means coupled to the atmosphere to receive air therein and to said water chiller line for receiving water passing therethrough, said inlet air conditioning means having a least one heat exchanger mounted therein and connected to said water chiller line for removing moisture from air passing through said heat exchanger means;
   said inlet air conditioning means having an inlet means having a bypass valve attached thereto, for directing air around said heat exchanger means, mounted in said inlet air conditioning means when said valve is opened, said inlet means having a fan mounted therein whereby actuation of said fan and the opening of said bypass valve will recirculate air through said heat exchanger;
   compressor means operatively coupled to said inlet air conditioning means for receiving air from said inlet air conditioning means and compressing said air; and reheat air dryer means connected to said compressor means for receiving compressed air therefrom, said reheat air dryer being adapted to cool and remove moisture from said compressed air.

12. A compressed air system in accordance with claim 11, in which said inlet air conditioning means has a pair of heat exchangers therein, each having an air inlet with a single outlet for increasing the capacity of said inlet air conditioning means.

13. The apparatus in accordance with claim 12, in which each of said heat exchanger inlets has a bypass valve attached thereto for bypassing the heat exchanger.

14. The compressed air system in accordance with claim 13, in which each bypass valve for each heat exchanger is thermostatically actuated through a damper motor to open said bypass valve.

15. The compressed air system in accordance with claim 14, in which each said inlet means has a repass valve to repass air through said heat exchanger.

16. A compressed air system in accordance with claim 15, in which said repass valve is thermostatically actuated by a damper motor upon reaching a predetermined temperature of the inlet air.

* * * * *